P. A. FRIMAND.
MILKING MACHINE.
APPLICATION FILED OCT. 16, 1915.

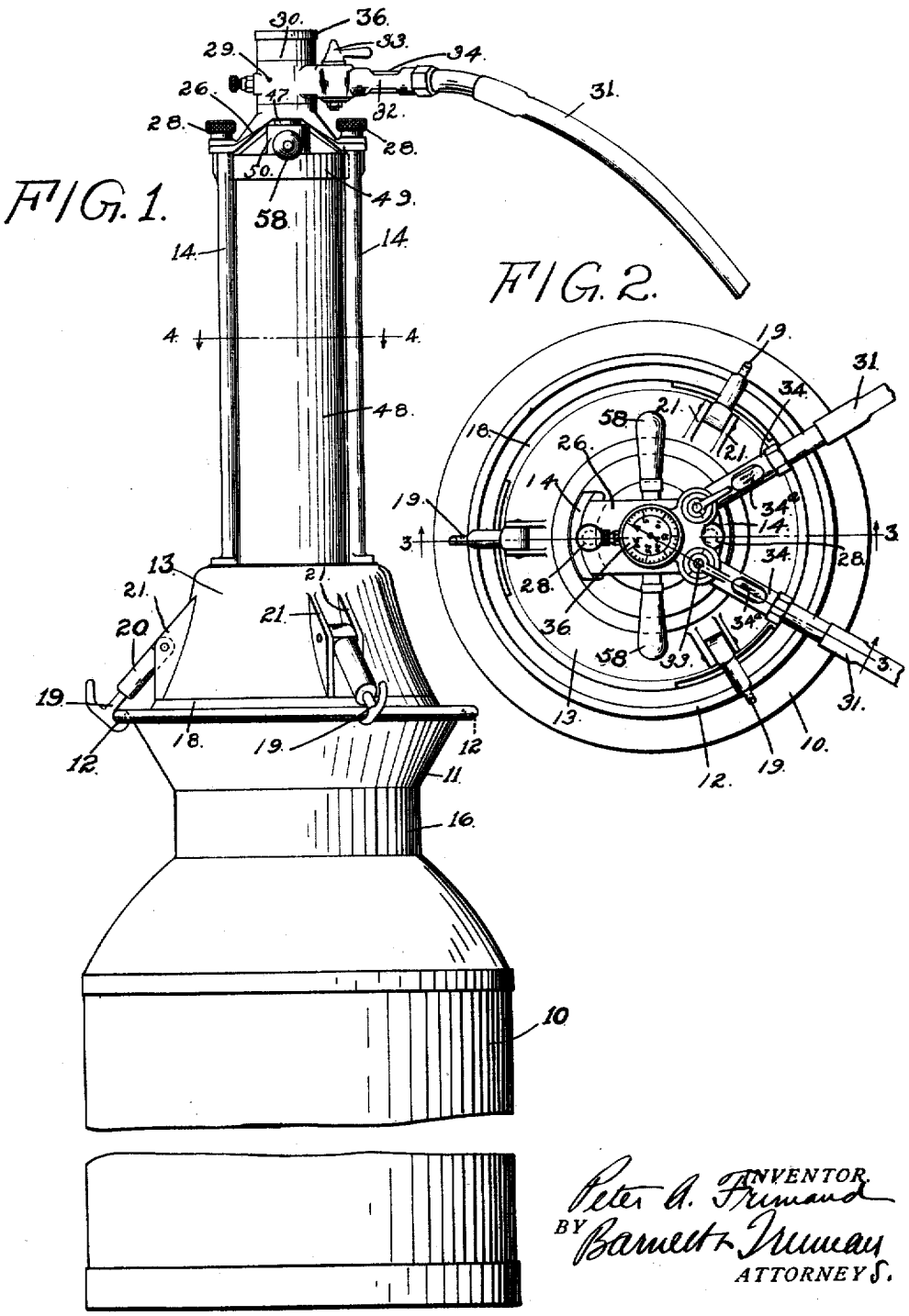

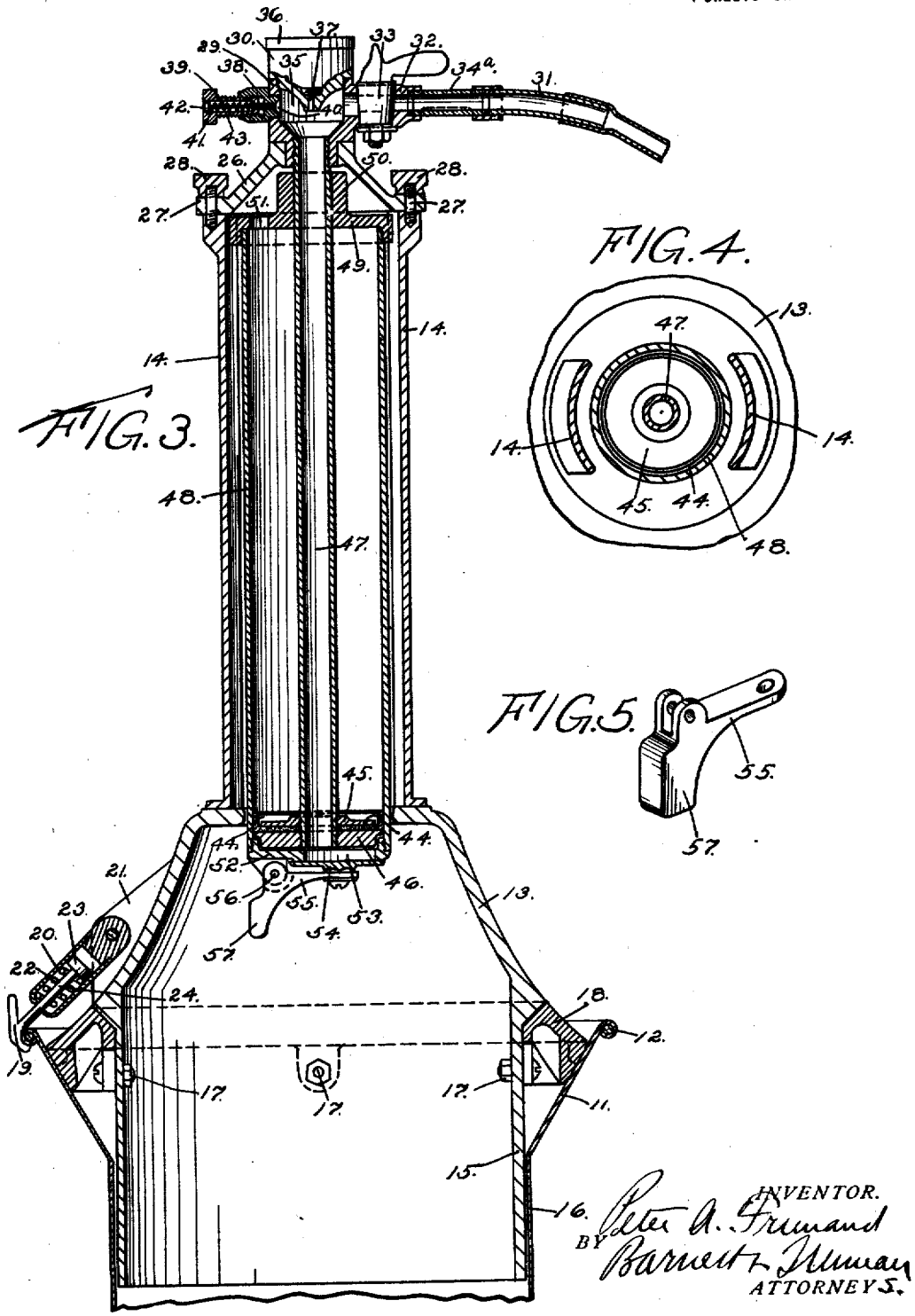

1,311,959.

Patented Aug. 5, 1919.
4 SHEETS—SHEET 3.

INVENTOR.
Peter A. Frimand
BY
Barnes & Truman
ATTORNEYS.

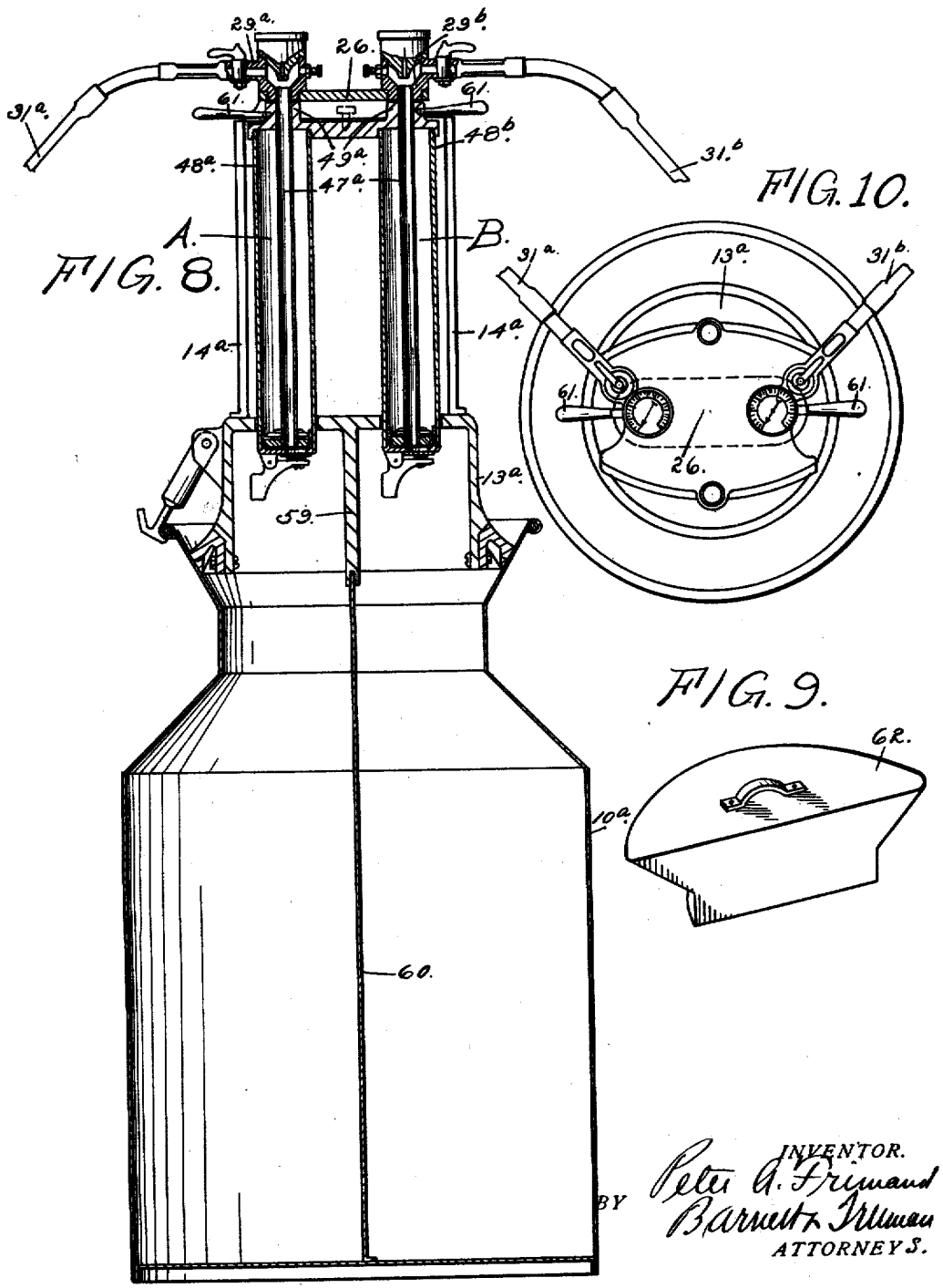

UNITED STATES PATENT OFFICE.

PETER A. FRIMAND, OF WILMETTE, ILLINOIS, ASSIGNOR TO THE BURTON PAGE COMPANY, OF CHICAGO, ILLINOIS, A CORPORATION OF ILLINOIS.

MILKING-MACHINE.

1,311,959.  Specification of Letters Patent.  Patented Aug. 5, 1919.

Application filed October 16, 1915. Serial No. 56,294.

*To all whom it may concern:*

Be it known that I, PETER A. FRIMAND, a citizen of the United States, residing at Wilmette, in the county of Cook and State of Illinois, have invented certain new and useful Improvements in Milking-Machines, of which the following is a specification.

My invention relates to milking machines and, more particularly, to milking machines of the vacuum type, in which the milking operation is performed by exhausting the air from teat cups or other similar devices attached to the cow's udder.

One of the principal objects of the invention is to provide a hand-operated milking machine which can be very conveniently handled and which will require for its operation but a small expenditure of force relative to its capacity.

A further object is to provide a milking machine utilizing a hand-operated exhaust pump which is so constructed that the down stroke of the pump is the exhausting or power stroke. The weight of the operator is in this way utilized on the stroke requiring power; and, as no appreciable resistance is encountered on the up stroke of the pump, the machine may be attached to an ordinary milk can, the weight of which and of the machine will keep the machine and the can in place when the pump handles are raised.

A further object of the invention is to provide a milking machine which can be conveniently and accurately controlled so that the milking of the cow is effected as expeditiously as possible and without injury to the animal. In this connection it has been my purpose to provide a suction milking machine which in its operation will reproduce or simulate the conditions attending hand milking to which the cow is accustomed, and, furthermore, to provide a machine which can be manipulated to vary the duration of the suction periods, the intensity of the suction applied and the rapidity with which the suction is developed at each stroke of the machine so that the operator may vary the operation of the machine to suit the particular cow being milked. With this object in contemplation the milking machine of my invention is provided with certain indicating devices which are arranged within plain sight of the operator, the machine as a whole being arranged and designed with this in view.

A further object of the invention is to provide means for supporting a machine on an ordinary milk can and for holding the same in place thereon.

A further object of the invention is to provide a milking machine which will be inexpensive to manufacture, simple in its construction so that it will not readily get out of order, which can be quickly cleaned, this being, of course, essential for sanitary reasons, and which will be light in weight and relatively small in size.

The invention consists in certain constructions and arrangements for carrying out the above stated objects, together with such other new and improved devices and combinations relating to milking machines as will be hereinafter described and claimed.

The invention is illustrated, in a preferred embodiment, in the accompanying drawings wherein—

Figure 1 is a side elevation of a milking machine, constructed in accordance with my invention, shown as mounted upon a milk can of conventional type.

Fig. 2 is a plan view of the same.

Fig. 3 is a longitudinal sectional view of the machine and upper end of the can on a scale larger than that of Fig. 1.

Fig. 4 is an enlarged sectional plan taken on line 4—4 of Fig. 1.

Fig. 5 is a view, in perspective, of the counterweighted rock arm which supports the valve of the pump.

Fig. 8 is a longitudinal sectional view illustrating a modified apparatus, and

Fig. 9 is a view in perspective of one of the covers of the can used in connection with the modified form of milking machine shown in Fig. 8.

Fig. 10 is a plan view of the apparatus.

Like characters of reference designate like parts in the several figures of the drawings.

Figure 6:
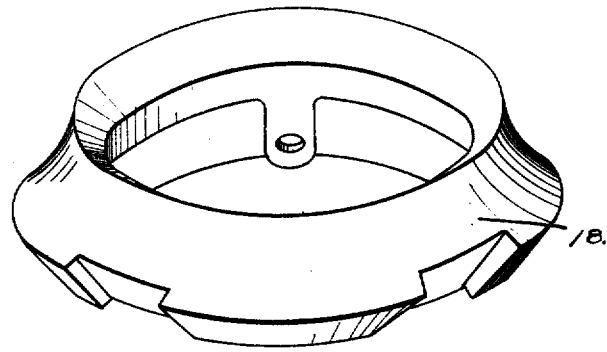
Fig. 6 is a view, in perspective, of the removable annular seat and the pump supporting structure designed to fit the flaring neck of the milk can.
Figure 7:
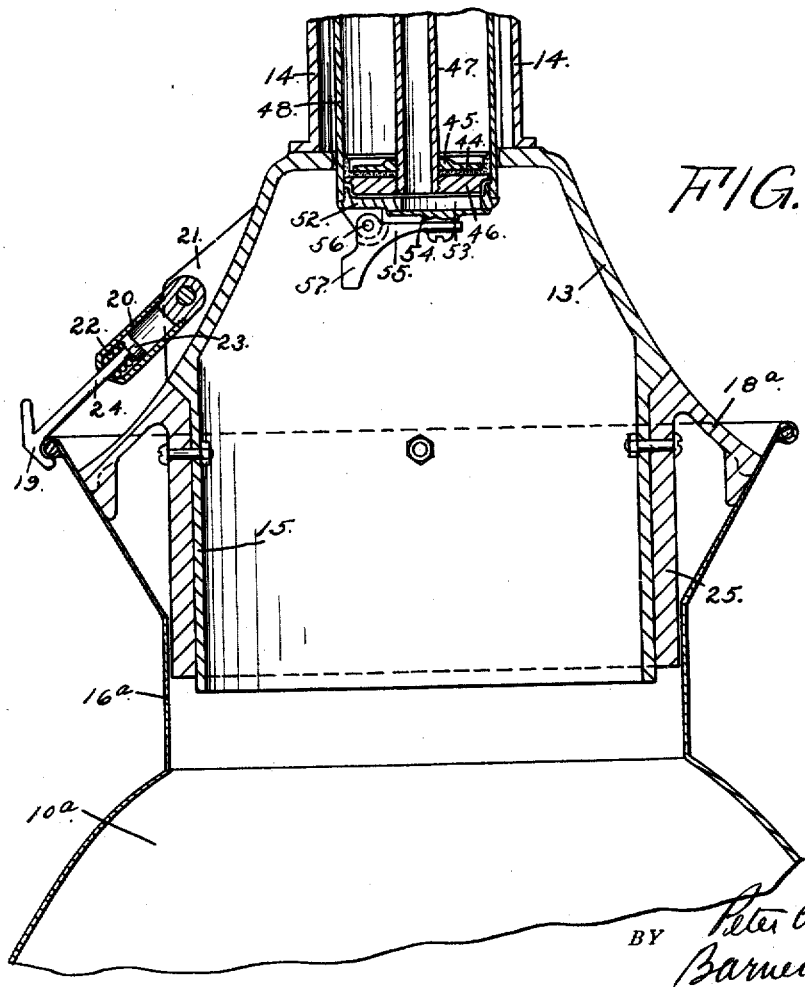
Fig. 7 is a sectional view of the lower part of the machine showing the machine as provided with a different form of annular seat member adapting the machine to a larger size can.

Referring first to Figs. 1 to 6 inclusive, 10 designates a milk can of conventional type having the usual flaring neck 11 terminating in a bead 12. In the preferred embodiment of my invention herein shown and described, the milking machine is so constructed as to be supported upon and attached to a can of this type. The operative parts of the machine are carried on a supporting structure consisting of a base 13 and uprights 14, 14. The base 13 has a depending flange 15 adapted to extend into the straight portion 16 of the neck of the can far enough so that the milk when discharged by the pump cannot splash out of the can. Attached to the base by bolts 17 is an annular seat member 18 adapted to bear against the flared portion 11 of the neck of the can. 19 are hooks adapted to engage the bead 12 of the can, the hooks extending into housings 20 pivoted between pairs of ears 21, 21 on the base member 13. Helical springs 22 are interposed between the outer ends of the housings and heads 23 on the shanks 24 of the hooks. In order to adapt the machine to milk cans of various sizes the seat member 18 is made removable. For a larger can, for example, it may be replaced by the seat member 18ª shown in Fig. 7. The member 18ª is formed with a depending flange 25 which fills, or nearly fills, the space between flange 15 and the straight portion 16ª of the can 10ª shown in this figure.

26 is a yoke supported on studs 27 on the uprights 14 and removably held in its place by nuts 28. The yoke supports a casing 29 closed on the top by a bonnet 30.

The machine shown herein is designed for milking two cows at the same time. It is provided, therefore, with two teat cup connections 31 which are attached to nipples 32 provided with cocks 33. The teat cup connections comprise preferably short pipe sections 34 which are formed with glazed openings 34ª by means of which the flow of milk from the teat cup connections to the receiving chamber 35 of the pump may be observed. A vacuum indicator 36 of any suitable type is arranged on top of the bonnet 30. This device, the construction of which is not detailed, is in communication with chamber 35 through a small duct 37 in the bonnet 30.

The machine is provided preferably with a safety valve adapted to open chamber 35 to the atmosphere in case the pressure in the chamber is reduced below a certain predetermined point, for example, in case the vacuum should exceed fifteen inches on the usual mercury scale.

Tapped into the side of the casing 29 is a plug 38 through which extends the stem 39 of a valve 40 which has a seat in the inner end of the plug. A spring 41 is interposed between a head 42 on the outer end of the valve stem and the inner end of a hollow nut 43 which is threaded into plug 38. The pressure of the spring tending to keep the valve 40 seated may be varied by an adjustment of the nut 43.

The pump consists preferably of a stationary piston and a reciprocating cylinder. The piston consists, as shown, of a cup-shaped leather 44 clamped between two disks 45, 46, which are screwed onto the threaded end of a tube or hollow piston rod 47, the upper end of which is threaded into the bottom of casing 29. The cylinder 48 is provided at the upper end with a head 49 and is guided on the piston rod 47 by a boss 50. The head of the cylinder is formed with an opening 51. The lower end of the cylinder is provided with a head 52 formed with a discharge opening 53 which is closed during the suction periods by a valve 54 on an arm 55 pivoted at 56 to the under side of the head and provided with a counterweight 57 which keeps the valve seated except when pressure is exerted against it. The cylinder 48 is preferably supplied with some convenient means for reciprocating the same by hand. For example, the handles 58, 58 may be formed on or attached to the cylinder head 49. It will be obvious that if desired the cylinder might be reciprocated by a motor although the machine as shown is intended particularly for hand operation. With this assumption the operation of the machine is as follows:

Operation: The machine is placed in the flaring neck of the milk can and the hooks 19 engaged with the bead 12 of the can. Any teat cups commonly employed in vacuum milking apparatus can be used with my machine. This part of the apparatus forms no part of my present invention and therefore has not been shown nor described. After the teat cups have been attached to the cow the operator who stands over the can and the machine takes hold of handles 58 and reciprocates the cylinder 48. On the down stroke, which is the power stroke, the air is sucked out through the teat cup connections, the milk, of course, following through chamber 35, the duct in the hollow piston rod 47 and into the space between the piston and the lower head of the cylinder. During the down stroke the valve 54 is kept seated by the suction developed above it. The down stroke will preferably be somewhat slow, depending upon the character of the cow or cows being milked. The up stroke may be as rapid as the operator wishes. In this respect the machine is more economical of time than a motor driven milking machine in which the return stroke can be no more rapid than the power stroke. When the cylinder moves upwardly the vacuum above the milk in the lower end of the cylinder disappears and, in fact, at the end of the stroke some back pressure may be developed. The weight of the milk and such back pressure as there may be, overcome the counterweight on the valve and the milk is discharged into the can.

By closing the cock 33 in one of the teat cup connections the machine may be used for milking a single cow; or the cocks may be used for varying the suction exerted against cows being milked simultaneously. Thus it may be desirable not to exert as much suction against one cow as against the other. The operator will soon learn how each cow is to be treated.

The milker may vary the operation of the machine by shortening or lengthening the power strokes, as seems best, by varying the speed at which the cylinder is moved and by manipulating the pump so as to apply the suction suddenly or gradually. Thus to get the best results the down or suction stroke should be relatively quick at first so that the vacuum will reach substantially its maximum intensity almost immediately. This causes the teat cup to take a hold on the cow's teats as the hand does in milking. After this the pump is depressed just fast enough and far enough to hold the vacuum at the desired intensity and this intensity may be varied at the discretion of the operator according to the particular animal being milked. The fact that the exhaust is produced on the down stroke of the pump facilitates the feature of control just described. It is within the power of the operator to observe at all times the intensity of the vacuum being developed. The vacuum indicator 36 is arranged on top of the machine so as to be readily observable while the pump is manipulated.

The maximum intensity of vacuum is determined by the adjustment of the safety valve 40. The valve can be tested and set by closing cocks 33, operating the pump and observing the vacuum indicator 36. By this means the danger of too strong a vacuum due to the clogging of the safety valve, for example, may be avoided. The safety valve has another function. It may be set to operate at a proper point and the pump manipulated rapidly enough so that the maximum intensity of vacuum will be reached during the first part of the stroke. During the remainder of the stroke the suction will be at a maximum, since the valve 40 will open just enough to maintain the desired reduction of pressure. By operating the machine in this way the milk may be withdrawn from the cow or cows very rapidly with the expenditure of a comparatively small amount of force and with no danger of injuring the animal.

It will be seen that the aggregate cubical contents of the air spaces which the pump has to act upon is comparatively small. The machine does not have the usual milk chamber from which the air must be exhausted before it is drawn from the teat cups and their connections. At the beginning of the down stroke the lower end of the cylinder is close against the piston. It is necessary to exhaust the air only from the relatively small duct in the piston rod and from the teat cups and their connections.

In Fig. 8 I have shown a machine designed for milking two cows at the same time, but constructed so that the milk from the cows is kept separate. Some dairymen prefer to milk each cow separately so as to keep an individual production record. In this machine there are two separate pumps designated A and B which, in construction, are the same as the single pump heretofore described. They are supported upon and project through the top of a base member 13ª which is preferably formed with an interior partition 59 alining with a partition 60 dividing the can 10ª into two compartments. The hollow piston rod 47ª of the pumps are connected to separate inlet casings 29ª, 29ᵇ which are supported on a casting 26 on the uprights 14ª. The teat cup connections 31ª, 31ᵇ are connected with casings 29ª, 29ᵇ, respectively. Handles 61 are provided for simultaneously reciprocating pump cylinders 48ª, 48ᵇ which are preferably provided with a common head 49ª to which the handles are attached.

In regard to details of construction, other than those just referred to, the milking machine of Fig. 8 is the same preferably as the machine shown in Figs. 1 to 5 inclusive. The can 10ª is provided with a semi-circular cover 62 which may be used to close one compartment while the other is being emptied.

While I have described my invention in certain preferred embodiments, it is realized that there might be considerable deviation from these constructions without departure from the principles of the invention. Therefore I do not wish to be understood as limiting the invention to the particular constructions, arrangements and devices shown and described except so far as the claims are so limited.

I claim:

1. In a milking machine, the combination of a supporting structure adapted to be placed over a milk can and provided at its upper end with a receiving chamber, a teat cup connection leading to said chamber, a hollow piston rod fixed to said supporting structure with the duct therein communicating with said chamber, a piston on said rod, and a reciprocating cylinder slidably arranged on the piston having a valved discharge opening in the bottom.

2. In a milking machine, the combination of a supporting structure adapted to be placed over a milk can and provided at its upper end with a receiving chamber, a teat cup connection leading to said chamber, a hollow piston rod fixed to said supporting structure with the duct therein communicating with said chamber, a piston on said rod, a reciprocating cylinder slidably arranged on the piston having a valved discharge opening in the bottom, and transversely projecting handles on the upper end of said cylinder.

3. In a milking machine, the combination of a supporting structure adapted to be placed over a milk can and provided at its upper end with a receiving chamber, a teat cup connection leading to said chamber, a hollow piston rod fixed to said supporting structure with the duct therein communicating with said chamber, a piston on said rod, a reciprocating cylinder slidably arranged on the piston having a valved discharge opening in the bottom, and a vacuum indicator at the upper end of said supporting structure adapted to give indication of the state of the vacuum in the receiving chamber.

4. In a milking machine, the combination of a supporting structure adapted to be placed over a milk can, comprising upright supporting members and provided at its upper end with a receiving chamber, a teat cup connection leading to said chamber, a hollow piston rod fixed to said supporting structure with the duct therein communicating with said chamber, a piston on said rod, a reciprocating cylinder, slidably arranged with respect to said piston, and having a valved discharge opening in the bottom.

5. In a milking machine, the combination of a supporting structure, the lower end of which is adapted to fit into the flaring end of a milk can and the upper end of which is provided with a receiving chamber, valved teat cup connections leading to said receiving chamber, a hollow piston rod secured to said supporting structure with the duct therein communicating with said chamber, a piston on the end of said rod, a reciprocating cylinder having a discharge opening in its lower end, handles for reciprocating the same, a gravity and suction operated valve pivoted to the under side of said cylinder to close said discharge opening during the suction periods, means for clamping said supporting structure to the milk can, a safety valve adapted to put said chamber in communication with the atmosphere at a predetermined reduction of pressure therein, and a vacuum indicator arranged above said chamber to indicate the condition of vacuum therein.

6. In a milking machine, the combination with a teat cup connection, of apparatus for exhausting the air from said connection in recurring pulsations, comprising a substantially vertical exhaust pump which produces suction on the down stroke, and which is operable by hand, thereby permitting variations in the length and rapidity of the strokes.

7. A milking machine of the type operating to withdraw milk from the cow by suction and to discharge the same to a receptacle at atmospheric pressure, comprising in combination means providing a milk receiving space arranged above said receptacle, a valveless, flexible teat cup conduit through which the milk passes unobstructedly from the teat cups to the milk receiving space, and means for creating a partial vacuum in said space, and conduit comprising a pump consisting of piston and cylinder members, one of which is movable with respect to the other and is provided with means operable and controllable directly by the milker whereby the stroke of the pump may be varied to vary the character of the suction impulses applied to the cow's udder.

8. A milking machine of the type operating to withdraw milk from the cow by suction and to discharge the same to a receptacle at atmospheric pressure, comprising in combination means providing a milk receiving space arranged above said receptacle, a flexible teat cup conduit through which the milk passes from the cow's udder to the milk receiving space, means for creating a partial vacuum in said space, and conduit, comprising a pump consisting of piston and cylinder members, one of which is movable with respect to the other and is provided with means for operating it by hand whereby the length of its stroke may be varied by the operator to vary the intensity of each suction impulse applied to the cow's udder, and a pressure indicator within the view of the operator to indicate the intensity of the vacuum created at each stroke of the pump.

9. A milking machine of the type operating to withdraw milk from the cow by suction and to discharge the same to a receptacle at atmospheric pressure, comprising in combination, means providing a milk receiving space arranged above said receptacle, a flexible teat cup conduit through which the milk passes from the cow's udder to the milk receiving space, and means for creating a partial vacuum in said space, and conduit comprising a pump arranged in substantially upright position and consisting of piston and cylinder members, one of which is movable downwardly to create a suction and is provided with means for operating it by hand whereby the length of its stroke may be varied by the operator to vary the intensity of each suction impulse applied to the cow's udder.

10. A milking machine of the type operating to withdraw milk from the cow by suction and to discharge the same to a receptacle at atmospheric pressure, comprising in combination, means providing a milk receiving space arranged above said receptacle, a flexible teat cup conduit through which the milk passes from the cow's udder to the milk receiving space, and means for creating a partial vacuum in said space, and conduit comprising a pump arranged in substantially upright position and consisting of piston and cylinder members, one of which is movable downwardly to create a suction and is provided with a pair of handles, one at each side, for operating the same by hand whereby the length of its stroke may be varied by the operator to vary the intensity of each suction impulse applied to the cow's udder.

PETER A. FRIMAND.

Copies of this patent may be obtained for five cents each, by addressing the "Commissioner of Patents, Washington, D. C."